United States Patent
Bruno et al.

(10) Patent No.: US 8,630,746 B2
(45) Date of Patent: Jan. 14, 2014

(54) OPERATING METHOD FOR A VEHICLE

(75) Inventors: Francesco Bruno, Hohenlinden (DE); Olaf Franke, Munich (DE)

(73) Assignee: MAN Truck & Bus AG, Munich (DE)

(*) Notice: Subject to any disclaimer, the term of this patent is extended or adjusted under 35 U.S.C. 154(b) by 0 days.

(21) Appl. No.: 13/595,649

(22) Filed: Aug. 27, 2012

(65) Prior Publication Data

US 2013/0226368 A1 Aug. 29, 2013

(30) Foreign Application Priority Data

Aug. 26, 2011 (DE) .................. 10 2011 111 555

(51) Int. Cl.
*G06F 7/00* (2006.01)
(52) U.S. Cl.
USPC .................................................. 701/1
(58) Field of Classification Search
USPC .................................. 701/1; 60/285–286
See application file for complete search history.

(56) References Cited

U.S. PATENT DOCUMENTS

| 6,644,115 | B2 * | 11/2003 | Cwik et al. | 73/290 R |
| 8,096,112 | B2 * | 1/2012 | Dalton | 60/295 |
| 2002/0184945 | A1 * | 12/2002 | Chase et al. | 73/290 V |
| 2004/0217103 | A1 * | 11/2004 | Knetsch et al. | 219/438 |
| 2010/0089037 | A1 * | 4/2010 | Bogema et al. | 60/286 |
| 2013/0160433 | A1 * | 6/2013 | Schepers et al. | 60/295 |

* cited by examiner

*Primary Examiner* — Mary Cheung
*Assistant Examiner* — Anne Mazzara
(74) *Attorney, Agent, or Firm* — Cozen O'Connor

(57) ABSTRACT

An operating method for a vehicle includes the steps of measurement of a filling level of a liquid, assignment of a measured filling level to a closest filling level threshold from a multiplicity of known filling level thresholds, wherein each filling level threshold represents a defined filling value, activation of at least one filling level threshold from the multiplicity of filling level thresholds by means of the measuring device, ascertainment of the frequention of an activation of a filling level threshold and/or a frequention of an assignment of a measured filling level to a closest filling level threshold, and determination of the filling level threshold which has a maximum frequention relative to a defined period of time. A realistic filling value is determined from which measuring errors which arise are eliminated.

24 Claims, 2 Drawing Sheets

OPERATING METHOD FOR A VEHICLE

BACKGROUND OF THE INVENTION

1. Field of the Invention

The invention relates to an operating method for a vehicle, in particular a commercial vehicle, for example a lorry, a bus or another motor vehicle. The operating method preferably serves to determine realistic filling values of a liquid in a vehicle container.

2. Background of the Invention

Within the scope of the EURO VI emission standard, the amount of nitrogen oxides in the exhaust gas of motor vehicles is intended to be reduced. In order to achieve this reduction, it is known to spray a urea-water mixture into the exhaust tract of the vehicles.

Similarly to other operating substances, the urea-water mixture is stored in a separate vehicle tank. A control device calculates the quantity of urea-water mixture required for the reduction sought. The calculated quantity of urea-water mixture is conveyed, for example, by a pump from the separate vehicle tank into the exhaust tract. If too little or no urea-water mixture is sprayed into the exhaust tract, too few nitrogen oxides, if any at all, are removed.

The aim is for vehicle users to replenish the urea-water mixture, and for a sufficient quantity of urea-water mixture to be used, for example in order to keep to the EURO VI emission standard.

It is an object of the invention to determine one or preferably more realistic filling values (for example volumetric quantity, filling level, etc.) of a liquid in a vehicle container, from which it is possible, for example, to derive a realistic removal of liquid which can be plausibility-checked (for example compared), preferably with a reference removal which is required, for example, in order to obtain a certain reduction of pollutants in the exhaust gas of the vehicle.

SUMMARY OF THE INVENTION

According to the invention, an operating method is provided for a vehicle, preferably a commercial vehicle, for example a lorry, a bus, etc., or another motor vehicle, in particular for determining realistic filling values (for example volumetric quantity, filling level, etc.) of a liquid in a vehicle container. The liquid is preferably a urea-water mixture, but may also be any other liquid within the scope of the invention.

The operating method first of all expediently makes provision to measure a filling level of a liquid in a vehicle container by means of a measuring device, for example a float.

A measured filling level is preferably assigned to a closest filling level threshold (for example switching threshold) from a multiplicity of expediently known filling level thresholds. Each filling level threshold can represent, for example, a defined filling value (for example volumetric quantity, filling level, etc.).

In particular, a filling level threshold from the multiplicity of filling levels thresholds can be activated by means of the measuring device.

In addition, it is possible that the frequention of an activation of a filling level threshold and/or the frequention of an assignment of a measured filling level to a closest filling level threshold, is ascertained, for example counted. Within the scope of the invention, frequention comprises in particular the frequency and/or the duration of activation of a filling level threshold and, as an alternative or in addition, in particular the frequency and/or the duration of an assignment of a measured filling level to a closest filling level threshold.

In particular, the filling level threshold which has a maximum frequention relative to an expediently defined period of time and therefore in particular represents a realistic filling value, preferably is determined, for the time during which the next determination is carried out. The determination can be carried out, for example, during or after, in particular immediately following the period of time mentioned.

The filling level thresholds are preferably spaced apart from one another and/or designed as discrete filling level thresholds.

The realistic filling value is preferably a discrete filling value.

An essential requirement for establishing whether sufficient liquid is removed from the liquid container is the knowledge of a realistic filling value (for example volumetric quantity, filling level, etc.) of the liquid in the vehicle container.

In particular, a realistic removal of liquid can be derived by means of a realistic filling value. It goes without saying that the removal of liquid corresponds in particular to a liquid consumption.

Within the scope of the invention, at least two realistic filling values are preferably determined and used, for example, in order to calculate a realistic removal of liquid. In particular, the difference between two realistic filling values, which difference corresponds to a realistic removal of liquid, is calculated. The removal of liquid therefore corresponds in particular to the quantity of liquid which lies between two filling level thresholds or two filling values.

The realistic removal of liquid (liquid consumption) is preferably plausibility-checked, in particular compared, with a reference removal (reference consumption). The reference removal is defined, for example, in such a manner that a certain reduction of pollutants in the exhaust gas of the vehicle is obtained.

The realistic filling value can be used in particular for checking or monitoring whether a reference value (for example a reference quantity) is also actually removed from the liquid container of the vehicle. The reference value is defined, for example, in such a manner that a certain reduction of pollutants in the exhaust gas of the vehicle is obtained.

The high dynamics of a liquid in a vehicle container (for example because of acceleration, braking, cornering, gradient, etc.) means that it is not advantageous to use directly measured filling levels directly, for example, for calculating the liquid consumption because this leads to imprecise results. This disadvantage can advantageously be avoided by the operating method according to the invention.

In addition, the operating method according to the invention affords the advantage that interfering variables, for example measuring noise or other errors caused, for example, by measuring technology, are substantially eliminated from the realistic filling values determined, and/or error measurements which arise in particular due to sloshing of the liquid as a function of the driving situation are substantially eliminated from the realistic filling values determined.

It is possible that the period of time is a dynamically dimensioned period of time. The period of time is therefore preferably a period of time which can be changed in length.

The period of time can be dimensioned, for example, as a function of a reference value. The period of time corresponds in particular to the period of time in which a predetermined quantity of liquid (for example urea-water solution) has been used. In this case, in order to determine the consumption, use is expediently made of the reference value which, as already mentioned, is defined in particular in such a manner that a certain reduction of pollutants in the exhaust gas of the vehicle is obtained.

The analysis and/or the determination can expediently be carried out after a reference value (for example a reference quantity) has been used.

It is possible for the operating method or at least one of the steps such as the measurement, the assignment, the activation, the ascertaining and the determination to be interrupted if the vehicle is in a standstill phase and/or a reference value does not indicate any removal of liquid. It is possible for the results therefrom to be discarded if the results originate from different standstill phases.

In addition, the operating method or at least one of the steps such as the measurement, the assignment, the activation, the ascertaining and the determination can be carried out during the same standstill phase of the vehicle or while the vehicle is moving.

It is possible that the period of time is extended if there is no unambiguous maximum frequention, for example if there are at least two maximum frequentions of equal value, i.e. in particular frequentions which are identical or are at least virtually identical or are of a similar magnitude. In particular, there is an unambiguous frequention if the maximum frequention is greater by a certain factor than the next smaller frequention.

The period of time can preferably be extended dynamically.

The period of time can be extended in particular as a function of a reference value.

As already mentioned, the frequention can comprise the frequency of an activation and/or of an assignment. As an alternative or in addition, the frequention can comprise the duration of an activation and/or of an assignment.

The liquid is preferably used for the aftertreatment of exhaust gases of the vehicle, in particular for reducing pollutants. The liquid is in particular a urea-water mixture, a urea-water solution, etc., i.e. in particular a urea-containing fluid.

It is possible for a removal of liquid (actual removal) in the container, which removal corresponds expediently to a consumption of the liquid, to be calculated as a function of one or more realistic filling values. The removal of liquid corresponds in particular to the difference between two realistic, preferably discrete, filling values determined.

For example, a first, preferably discrete, filling value can be determined at a first instant and a second, preferably discrete, filling value can be determined at a second instant. The difference between the first filling value and second filling value expediently corresponds to a removal of liquid in particular between the first instant and the second instant.

In particular, the removal of liquid can be plausibility-checked (for example compared) with a reference removal (desired removal), for example over an expediently defined time interval.

An (actual or realistic) removal of liquid (actual removal) can therefore advantageously be compared with a reference removal (desired removal). An operating limitation of the vehicle can preferably be activated as a function of the deviation or in general a deviation between the removal of liquid and a reference removal.

In the event of a deviation between the actual removal and desired removal, it may be assumed, for example, that the system has been manipulated in order to obtain a lower consumption of liquid. In order to prevent this, operating limitations can be initiated.

The reference removal (reference consumption) is defined, for example, in such a manner that a certain reduction of pollutants in the exhaust gas of the vehicle is obtained.

It is expedient that an operating limitation of the vehicle is activated if the realistic filling value falls below a reference value, for example over an expediently defined time interval (preferably by a predetermined magnitude). As an alternative or in addition, an operating limitation of the vehicle can be activated if the removal of liquid falls below the reference removal, for example over an expediently defined time interval (preferably by a predetermined magnitude). Likewise as an alternative or in addition, an operating limitation of the vehicle can be activated if too small a removal of liquid (preferably by a predetermined magnitude) is calculated from one or more realistic filling values, for example, over an expediently defined time interval.

The abovementioned period of time and the abovementioned time interval may correspond to each other or differ from each other.

The reference value is preferably based on expediently currently measured exhaust gas values or operating parameters (for example speed, fuel consumption, etc.) of the vehicle. The operating method can therefore comprise the step of sensing/measuring exhaust gas values or operating parameters of the vehicle.

It is possible for a reference value to be calculated as a function of the sensed exhaust gas values or operating parameters, which reference value is required, for example, in order to obtain a certain reduction of pollutants in the exhaust gas of the vehicle.

The reference value is preferably calculated by a control unit of the vehicle and is preferably continuously updated, for example while the vehicle is moving or in general the vehicle motor is switched on.

The reference value is preferably a dynamically dimensioned and/or variable reference value, in particular because the exhaust gas values or the operating parameters of the vehicle virtually continuously change.

It is possible for the operating limitation to be activated as a function of the engine operation duration (for example engine operation hours) during which the realistic filling value deviates from a reference value, and/or during which the calculated removal of liquid falls below a reference value, and/or during which a removal of liquid is too small to obtain a certain reduction of pollutants in the exhaust gas of the vehicle.

Within the scope of the invention, the reference value preferably corresponds to a reference quantity, in particular to a reference removal, or vice versa. The reference value, preferably the reference quantity, in particular the reference removal, may be defined, as already mentioned, in such a manner that a certain reduction of pollutants in the exhaust gas of the vehicle is obtained. Within the scope of the invention, the reference value may, however, also comprise other reference characteristics.

It should be mentioned that, within the context of the invention, the period of time is preferably a dynamically dimensioned (for example variable) period of time and can be dimensioned, for example, as a function of the reference value.

The reference values mentioned may be one and the same reference value, namely expediently the reference value which indicates how much liquid is necessary for reducing the pollutants in the exhaust gas of the vehicle.

In addition, it should be emphasized once again that the realistic filling value is in particular an actual filling value and/or the removal of liquid is in particular an actual removal of liquid. By contrast, the reference value is in particular a desired reference value and/or the reference removal is a desired reference removal.

The removal of liquid preferably corresponds to a consumption of liquid while the reference removal preferably corresponds to a reference consumption.

The above features and embodiments according to the invention can be combined with one another arbitrarily.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWINGS

Other advantageous embodiments of the invention are described below in conjunction with the attached figures, in which.

DETAILED DESCRIPTION OF THE PRESENTLY PREFERRED EMBODIMENTS

Figure 1:
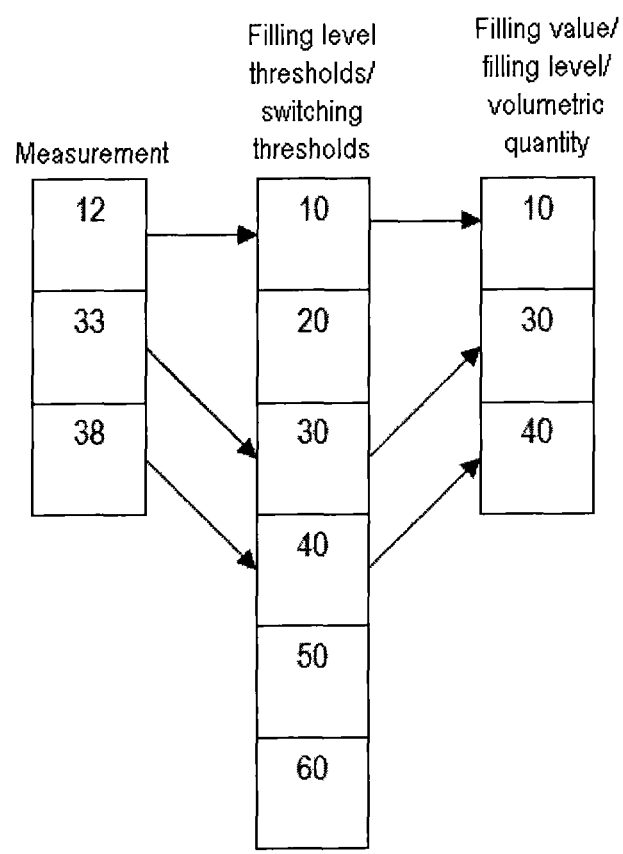
FIG. 1 is a schematic illustration of the determination of realistic filling values of a liquid in a vehicle container according to an exemplary embodiment of the invention.

FIG. 1 shows a schematic illustration of the determination of realistic filling values of a liquid in a vehicle container according to an exemplary embodiment of the invention. The liquid is used for the aftertreatment of exhaust gases and is in particular a urea-water mixture.

By means of a filling level transmitter, a filling level of the liquid can be measured with the aid of a float which is movable in a substantially vertical direction in a pipe or outside a pipe (for example around a pipe). Discrete filling level thresholds, for example in the form of switching thresholds, which can be activated by the float as soon as the float reaches a filling level threshold, can be located at uniform distances within the pipe. Each filling level threshold corresponds to a defined filling value, in particular a filling level height, and, preferably by means of the known geometry of the container, to a volumetric quantity. It is apparent from FIG. 1 that a measured filling level (compare the left column in FIG. 1) is not used directly for the determination of a filling value but rather is assigned to a closest filling level threshold from a multiplicity of known filling level thresholds.

If, for example, a filling level "12" is measured, this filling level is assigned to the filling level threshold "10". A measured filling level "33" is assigned, for example, to a filling level threshold "30" while a filling level "38" is assigned, for example, to a filling level threshold "40".

In addition, the frequention of an activation of a filling level threshold by means of the float and, as an alternative or in addition, the frequention of an assignment of a measured filling level to a closest filling level threshold are counted, wherein by using the term frequention we mean in particular duration and/or frequency.

Subsequently, the filling level threshold which has a maximum frequention relative to a defined period of time and therefore represents a realistic discrete filling value (compare right column in FIG. 1) is ascertained, in particular for the time during which the next determination is carried out.

Figure 2:
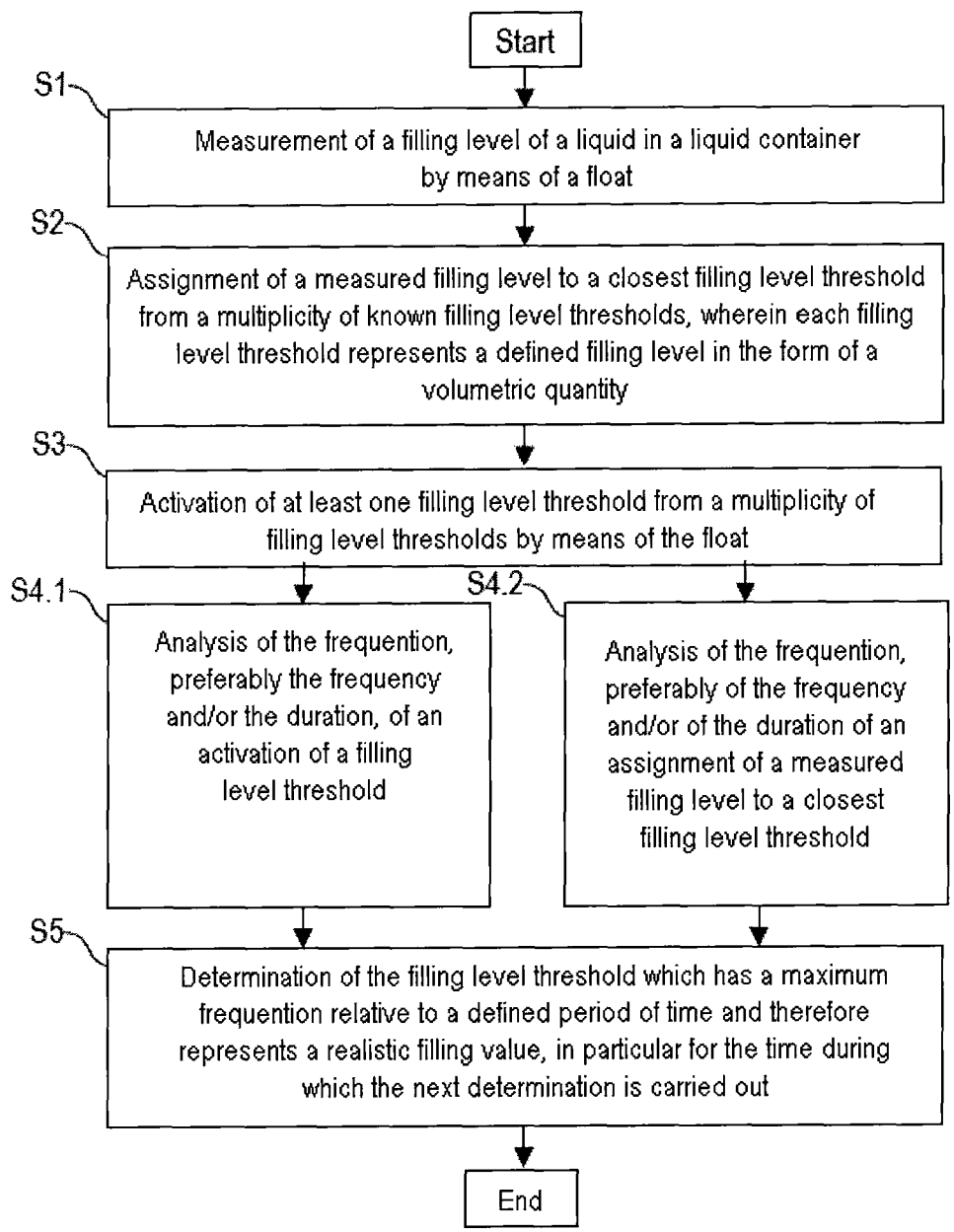
FIG. 2 is a flow diagram of an operating method according to an exemplary embodiment of the invention.

FIG. 2 shows a flow diagram of an operating method according to an embodiment of the invention, which operating method can be carried out in conjunction with the principle explained with reference to FIG. 1.

In step S1, a filling level of a liquid in a vehicle container is measured by means of a measuring device, for example a float.

In step S2, a measured filling level is assigned to a closest filling level threshold from a multiplicity of known filling level thresholds, wherein each filling level threshold represents a defined filling value, for example in the form of a filling level or a volumetric quantity. The filling level threshold is designed as a switching threshold.

In step S3, a filling level threshold from the multiplicity of filling level thresholds is activated by means of the float.

In step S4.1, the frequention of an activation of a filling level threshold is ascertained. As an alternative or in addition, in a step S4.2, the frequention of an assignment of a measured filling level to a closest filling level threshold is ascertained.

In step S5, the filling level threshold which has a maximum frequention relative to a defined period of time, for example during or after a defined period of time, and therefore represents a realistic discrete filling value, is determined, specifically in particular for the time during which the next determination is carried out.

The period of time is preferably a dynamically dimensioned and therefore in particular variable period of time.

The dimensioning of the period of time, in particular the time limit for ascertaining the frequention, is described below. The greater the consumption of the liquid, the more rapidly the actual filling level of the liquid in the container changes. For this reason, a reference value in the form of a theoretically consumed quantity of said liquid is used in order to define the duration of the period for ascertaining of the frequention. A continuous frequention ascertainment is evaluated in particular as soon as a reference value, which is required in order to obtain a certain reduction of pollutants in the exhaust gas of the vehicle, has been used. The frequention ascertainment can be interrupted if the vehicle is at a standstill and, in addition or as an alternative, no liquid is being used.

This measure is advantageous since, for example, if a vehicle is parked on a gradient, an inaccurate filling level is measured. The frequention of the correspondingly inaccurately measured filling level threshold should not be weighted too heavily.

If, after expiry of the period of time, an unambiguous maximum frequention of an individual filling level threshold cannot be determined and therefore neither can an unambiguous realistic filling value, the period of time can be extended by the time in which a further quantity of liquid is consumed. An unambiguous maximum frequention is in particular provided only when the greatest frequention is greater by a defined factor than the next smaller frequention.

The ascertainment of the frequention and the determination of the filling level threshold which has a maximum frequention relative to a defined period of time are evaluated after the reference value, which is preferably associated with a reference quantity, has been used.

The operating method is carried out in particular during the same standstill phase of the vehicle or while the vehicle is moving. By contrast, the operating method, or at least one or more steps thereof, are/is interrupted if the vehicle is, for example, in a standstill phase and the reference value does not decrease, i.e. in particular does not reflect any removal of liquid.

It is apparent that the reference value corresponds to a theoretically determined reference consumption of the liquid that is calculated by a control unit of the vehicle.

The operating method shown in FIG. 2 can be supplemented by a multiplicity of further steps according to preferred embodiments of the invention.

Thus, the period of time can be extended as a function of a reference value which is required in order to obtain a certain reduction of pollutants in the exhaust gas of the vehicle.

In addition, a corresponding removal of liquid can be calculated as a function of one or more determined realistic filling values, said removal of liquid being compared with a reference removal over a defined time interval.

Furthermore, an operating limitation of the vehicle can be activated if the realistic filling value (actual value) falls below a reference value (desired value) over a defined time interval, or if the realistic removal of liquid (actual removal) falls below a reference removal (desired removal) over a defined time interval, or if a removal of liquid which is too small to obtain a certain reduction of pollutants in the exhaust gas of the vehicle is calculated from one or more realistic filling values (actual value).

The reference value is based on sensed, changing exhaust gas values and operating parameters of the vehicle and therefore corresponds to a dynamically dimensioned reference value which is calculated by a control unit of the vehicle and can be continuously updated.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. An operating method for a vehicle for determining realistic filling values of a liquid in a vehicle container, comprising the following steps:
    measuring a filling level of a liquid in a vehicle container by means of a measuring device;
    assigning a measured filling level to a closest filling level threshold from a multiplicity of known filling level thresholds;
    activating a filling level threshold from the multiplicity of filling level thresholds by means of the measuring device;
    ascertaining the frequention of at least one of an activation of a filling level threshold and the frequention of an assignment of a measured filling level to a closest filling level threshold; and
    determining the filling level threshold which has a maximum frequention relative to a defined period of time so as to represent a realistic filling value.

2. The operating method according to claim 1, wherein each filling level threshold represents a defined filling value.

3. The operating method according to claim 1, wherein the filling level threshold is determined for the time during which the next determination is carried out.

4. The operating method according to claim 1, wherein the period of time is a dynamically dimensioned period of time, corresponding to a period of time in which a predetermined quantity of liquid has been consumed, and a reference value is used for the determination of the liquid consumption, said reference value being defined such that a predetermined reduction of pollutants in the exhaust gas of the vehicle is obtained.

5. The operating method according to claim 4, wherein
    the reference value is one of a dynamically dimensioned reference value and based on detected exhaust gas values or operating parameters of the vehicle, and
    is calculated by a control device of the vehicle.

6. The operating method according to claim 4, wherein the reference value corresponds to a reference quantity required to obtain a certain reduction of pollutants in the exhaust gas of the vehicle.

7. The operating method according to claim 1, wherein the period of time is dimensioned as a function of a reference value.

8. The operating method according to claim 1, wherein the at least one of the step of ascertaining and determining is carried out after a reference value has been used.

9. The operating method according to claim 1, wherein at least one of the steps of measuring, assigning, activating, ascertaining and determining is interrupted when the vehicle is in at least one of a standstill phase and a reference value does not indicate a removal of liquid.

10. The operating method according to claim 1, wherein at least one of the steps of measuring, assigning, activating, ascertaining and determining is carried out during the same standstill phase of the vehicle or while the vehicle is moving.

11. The operating method according to claim 1, additionally comprising extending the period of time if there is no unambiguous maximum frequention.

12. The operating method according to claim 11, wherein the period of time is extended if there are at least two maximum frequentions of equal value.

13. The operating method according to claim 11, wherein the period of time is extended dynamically.

14. The operating method according to claim 11, wherein the period of time is extended as a function of a reference value.

15. The operating method according to claim 1, wherein the frequention comprises the frequency of one of an activation and assignment.

16. The operating method according to claim 1, wherein the frequention comprises the duration of one of an activation and assignment.

17. The operating method according to claim 1, wherein the liquid is used for the aftertreatment of exhaust gases.

18. The operating method according to claim 17, wherein the liquid is a urea-water mixture.

19. The operating method according to claim 1, additionally comprising the step of calculating a removal of liquid as a function of one or more realistic filling values.

20. The operating method according to claim 19, additionally comprising the step of determining a first realistic filling value at a first instant and a second realistic filling value at a second instant, and wherein the difference between the first filling value and second filling value corresponds to a removal of liquid in the container.

21. The operating method according to claim 19, wherein the calculated removal of liquid is compared with a reference value and an operating limitation of the vehicle is activated if the calculated removal of liquid and the reference value differ.

22. The operating method according to claim 1, additionally comprising the step of an activating operating limitation of the vehicle
    if the realistic filling value differs from a reference value over a defined time interval, if the calculated removal of liquid falls below a reference value over a defined time interval, and/or if a removal of liquid is calculated from one or more realistic filling values, the removal of liquid being too small in order to obtain a certain reduction of pollutants in the exhaust gas of the vehicle.

23. The operating method according to claim 22, wherein the operating limitation is activated as a function of the engine operating period during which the realistic filling value differs from a reference value, during which the calculated removal of liquid falls below a reference value, and/or during which a removal of liquid is too small in order to obtain a certain reduction of pollutants in the exhaust gas of the vehicle.

24. The operating method according to claim 1, wherein the filling level thresholds are discrete or the realistic filling value is discrete.

* * * * *